United States Patent [19]
Lindstrom et al.

[11] Patent Number: 4,524,094
[45] Date of Patent: Jun. 18, 1985

[54] SELF-SUPPORTING CATALYTIC SLEEVE FORMED OF INTERWOVEN LOOSELY PACKED MULTI-FIBER STRANDS FOR RECEIVING AIR-COMBUSTIBLE GAS MIXTURES FOR FLAMELESS CATALYTIC COMBUSTION ALONG THE SLEEVE

[75] Inventors: Robert Lindstrom, Reading; Robert J. Allen, Saugus, both of Mass.

[73] Assignee: Prototech Company, Newton Highlands, Mass.

[21] Appl. No.: 602,011

[22] Filed: Apr. 19, 1984

[51] Int. Cl.³ .................... F16L 13/08; B32B 5/16; D04C 1/00
[52] U.S. Cl. ..................... 428/36; 428/240; 428/242; 428/263; 87/8; 87/9
[58] Field of Search .................. 428/35, 36, 365, 240, 428/242, 260, 263; 57/87.1, 87.9; 87/8, 9

[56] References Cited
U.S. PATENT DOCUMENTS

| 2,344,181 | 3/1944 | Stone | 87/9 |
| 2,353,226 | 7/1944 | Driscoll et al. | 87/1 |
| 4,102,819 | 7/1978 | Petrow et al. | 252/460 |
| 4,399,185 | 8/1983 | Petrow | 428/253 |

Primary Examiner—George F. Lesmes
Assistant Examiner—Beverly K. Johnson
Attorney, Agent, or Firm—Rines and Rines, Shapiro and Shapiro

[57] ABSTRACT

This disclosure is concerned with a novel multiple quartz fiber or similar yarn braided, supportable cylindrical sleeve carrying catalytic coatings for effective flameless catalytic combustion of an air-gas mixture axially fed to the cylinder.

5 Claims, 4 Drawing Figures

SELF-SUPPORTING CATALYTIC SLEEVE FORMED OF INTERWOVEN LOOSELY PACKED MULTI-FIBER STRANDS FOR RECEIVING AIR-COMBUSTIBLE GAS MIXTURES FOR FLAMELESS CATALYTIC COMBUSTION ALONG THE SLEEVE

BACKGROUND OF THE INVENTION

The present invention relates to catalytic structures formed of catalyst-carrying loosely packed fibers or filaments into and through which air-butane or other combustible gas mixtures may be flowed to generate flameless catalytic combustion, upon ignition, for such purposes as curling irons and other similar apparatus.

In earlier U.S. Pat. No. 4,399,185 of common assignee with the present invention, a satisfactory structure of this nature is disclosed in which the loosely packed fibers remain in matte form and are catalyzed in a manner that retains the required porosity and pressure drop characteristics, while remaining flexible enough to be formed into cylindrical or other desired geometrical shapes through which combustible gas-air mixtures may be flowed, for the above and other purposes. Such an approach, however, requires both a supporting hollow, gas-permeable or perforated internal mandril, dowel or form upon which the matte may be supported throughout its cylindrical form, and an external permeable cylindrical containing element, such as a helical spring or coil. In operation, the air-gas mixture is introduced along the interior of the internal mandril, escapes through the perforations or holes therein into the surrounding catalyzed matte fibers and through the interstices of the spring or coil or other external container, generating flameless combustion within and along the matte, upon ignition. WHile this structure has proven to be admirably successful for hair curling-iron applications, there are certain disadvantages thereto due to the inherent mechanical weakness and lack of uniformity of the matte. Specifically, it is necessary to hold the matte in cylindrical form by wrapping it around an internal supporting structure. This operation is not only costly in itself, but this disadvantage is seriously aggravated by holes often unavoidably produced in the mattes while routinely and rapidly wrapping them around an internal mandril or dowel. A significant rejection rate of, for example, hair curlers results from such defects because such holes cause waste of fuel and non-uniform excessive aging of the catalyst at "hot spots" generated at perforations of the mandril or dowel in the vicinity of such holes.

SUMMARY OF THE INVENTION

It is to the obviating of these difficulties, while preservingg the advantages of using loose quartz of similar inorganic fibers or filaments, that the present invention is directed, it being an object of the invention to provide a new and improved catalytic structure of catalyzed strands of loosely packed supporting fibers formed into a self-supporting loosely braided cylindrical sleeve, rather than all matted into flexible sheet form.

A further object is to provide a novel improved low-pressure drop catalytic structure particularly suited for flameless catalytic combustion of air-gas mixtures.

Other and further objects will be explained hereinafter and are more fully delineated in the appended claims.

In summary, however, from one of its important aspects, the invention embraces a self-supporting air-gas mixture-receiving flameless combustion catalytic device comprising strands or yarns of loose matte-like packed and twisted inorganic fibers braided loosely into a cylindrical sleeve, means for mounting the uniformly porous sleeve at one end to receive the air-gas mixture flowing along the axis of the sleeve as it extends possibly, though not necessarily, self-supportable therebeyond, and a catalytic coating provided uniformly on the external surfaces of the strands, as braided, and within the interstices thereof, the tension of braiding being adjusted to maintain low pressure drop consistent with both self-supporting mechanical strength preventing accidental hole-formation in the cylindrical form and sufficient catalytic surface area of braid to effect substantially uniform and complete flameless combustion of the air-gas mixture flowing transversely through the sleeve along its longitudinal axis. In many applications it is desirable that the end of the braided sleeve is closed off, for example, with catalyzed fiber material or by stapling. Preferred details and best mode embodiment are later presented.

BRIEF DESCRIPTION OF THE DRAWINGS

The invention will now be described with reference to the accompanying drawing

DESCRIPTION OF THE PREFERRED EMBODIMENTS

Figure 1:
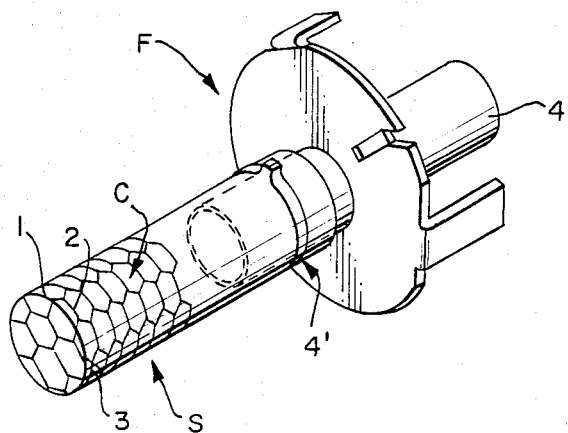
FIG. 1 of which is an isometric view of a preferred embodiment, with parts shown in exploded form (FIG. 1a) to illustrate details of construction.
Figure 1A:
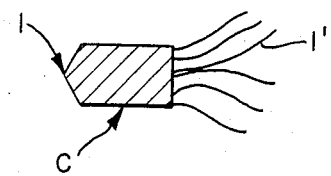

Individual elongated matte-like yarns or strands 1, 2, 3, etc., FIG. 1, composed of loosely packed and twisted adjacent fibers (unravelled at 1', FIG. 1a) are shown braided loosely into a cylindrical sleeve S. In the braiding, the interstices thereof provide air-gas permeability as does the loose packing of the matte-like twisted fibers forming each strand or yarn 1, 2, 3, etc., but the thickness of the strands or yarns and the tension or tightness of the braiding are controllable for adjusting the desired mechanical and gas-flow characteristics. If the braiding is pulled at the ends, the central region becomes of less diameter and becomes more tightly braided; whereas if the free ends are pushed towards one another, the central portion increases in diameter and in looseness—so that this braiding technique is particularly suitable for the purposes of the invention in obtaining the desired compromise between fluid flow porosity or pressure drop and uniform as well as self-supporting rigidity.

The inner end of the sleeve S may thus be slid upon a short extension 4 of the air-gas inlet conduit directed to flow the gas along the longitudinal axis of the sleeve S and supported by a flange F that will connect with the external tubular cylinder (not shown) of, for example, the before-mentioned hair curling iron, with the catalyzed sleeve S supportable in cylindrical form, as shown. This construction enables the air-gas mixture to flow longitudinally axially along the inside surface of the sleeve S and to permeate transversely through the sleeve to the external catalytic coating C, later described, and absent hot spots or other discontinuities that cause non-uniformity effects. If desired, a clamping sleeve 4' may be used at the inlet end of the sleeve S and a partial or total heat-conducting internal perforated mandril or screen 4", FIG. 2, may also be supplementarily used, as later described, particularly for heating functions, though not essential, as may external holding springs, also not essential.

With this braided construction it has been suprisingly determined that the noble-metal catalyzing, as by platinum, may be effected on the external surfaces of the sleeve S at C, catalyzing the twisted exposed regions of the loose fibers, the regions where they cross, as braided, and internal regions thereadjacent at the interstices, providing sufficient catalytic surface area without the necessity for catalyzing the internal surfaces of the sleeve S, with substantially complete flameless combustion occurring quite uniformly along the external surface of the sleeve. The catalyst may be of the type and may be applied as taught in said Letters Patent; namely metal oxide particles, as of $Al_2O_3$, $SiO_2$, $ZrO_2$ and $T_iO_2$ and the like (about 100 Angstroms or greater), applied and heat-dried on the external sleeve surface and fiber crossing interstices at high temperature (say 340° C.) to adhere, and coated with colloidal platinum (preferbly though not essentially of the order of 20 Angstroms as described in U.S. Pat. No. 4,102,819) or non-colloidal chloroplatinic acid or the like adsorbed thereupon.

Figure 2:
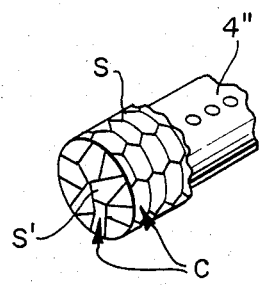
FIGS. 2 and 3 are similar views of modifications.
Figure 3:
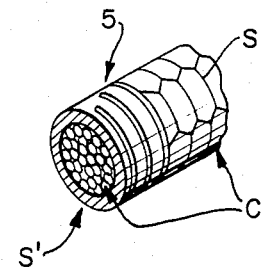

In some applications, it is important to provide means for preventing the gases from exiting through the open end of the sleeve S as by closing the end or by wiring, stapling, or otherwise blocking as at $S^1$, FIG. 2, or with a porous catalyzed quartz fiber end matte $S^1$, FIG. 3, shown held on by a terminal holding spring 5. In practice, this latter course has proved advantageous in that the extra catalyst area provided by this end closure of catalytic fiber material $S^1$ tends to aid the light-off characteristics of the catalytic device; or, otherwise stated, facilitates ignition.

In the case of the above-mentioned air-butane hair curler, it is advantageous to minimize the time of arriving at its operating temperature. If a period of the order of minutes between ignition and uniform flameless combustion along the entire sleeve is required, a metallic partial or total heat-conducting internal perforated mandril or screen 4″ may be used, FIG. 2, preferably total, to help in accelerating heat propagation.

The following comparison of the operation of the sleeve S of the present invention with the operation of the rolled matte of said Letters Patent with catalytic flameless combustion of isobutane-air mixtures has been obtained.

| | % Isobutane In Steady State Hot Flow | % Isobutane Conversion During Steady State Hot Flow Conditions | % CO Generation | Maximum Temperature °C. (exterior) |
|---|---|---|---|---|
| Rolled | 3.51% | 75.1% | 1.07% | 142° |
| Catalytic Matte Catalyzed Sleeve S-Mandril supported | 3.25 | 97.5 | 0.46 | 156° |
| Catalyzed Sleeve S-Unsupported | 3.37 | 91.4 | 0.38 | 154° |

This demonstrates marked better conversion by the sleeve construction of the invention; and by setting at a lower temperature, less fuel will be consumed providing a longer use per fuel charge of the curling iron or similar device.

While inorganic fibers such as one sold under the trade name Nextel 312 Fibers, composed of by weight 62% aluminum oxide, 14% boron oxide and 24% silicon dioxide, or similar filaments have been preferred, other high temperature filaments such as thin metal wires may also be employed, if desired, as may other well-known catalytic coatings. Further modifications will occur to those skilled in this art and such are considered to fall within the spirit and scope of the invention as defined in the appended claims.

What is claimed is:

1. A self-supportable air-gas mixture-receiving flameless combustion catalytic device comprising strands or yarns of loose packed and twisted inorganic fibers braided uniformly and loosely into a cylindrical sleeve, means for mounting the sleeve at one end to receive the air-gas mixture flowing along the axis of the sleeve as it extends substantially self-supportable therebeyond, and a catalytic coating provided on the external surfaces of the strands, as braided, and within the interstices thereof, the tension of braiding being adjusted to maintain low pressure drop consistent with both self-supporting mechanical strength in the cylindrical form and sufficient catalytic area of braid to effect substantially complete flameless combustion of the air-gas mixture flowing transversely through the sleeve along its longitudinal axis.

2. A self-supportable catalyzing device as claimed in claim 1 and in which the sleeve surrounds a metallic heat conducting perforated mandril extending partially or completely through the sleeve.

3. A self-supportable catalytic device as claimed in claim 1 and in which the free end of the sleeve is closed off.

4. A self-supportable catalytic device as claimed in claim 3 and in which the said free end is closed off with catalyzed fiber material.

5. A self-supportable catalytic device as claimed in claim 1 and in which the fibers are inorganic and the catalytic coating comprises platinum particles coated onto metal oxide particles which have been deposited on the fibers.

* * * * *